Dec. 5, 1944.  M. E. DICE  2,364,346
APPARATUS FOR GAUGING TANKS
Filed May 17, 1943  2 Sheets-Sheet 1

MARION E. DICE
INVENTOR

ATTORNEY

Dec. 5, 1944.  M. E. DICE  2,364,346
APPARATUS FOR GAUGING TANKS
Filed May 17, 1943  2 Sheets-Sheet 2

MARION E. DICE
INVENTOR
ATTORNEY

Patented Dec. 5, 1944

2,364,346

UNITED STATES PATENT OFFICE 2,364,346

APPARATUS FOR GAUGING TANKS

Marion E. Dice, Los Angeles, Calif., assignor to Socony-Vacuum Oil Company, Incorporated, New York, N. Y., a corporation of New York Application May 17, 1943, Serial No. 487,399

5 Claims. (Cl. 33—126.5)

The primary object of the invention is to provide a simple and effective means for gauging with accuracy the momentary contents of tanks containing liquids.

An object of the invention is to provide means for gauging spherical or spheroidal tanks or others in which the gauge distance from roof to floor is not constant but varies with the weight of the contents of the tank.

An object of the invention is to provide means for gauging the depth of liquid in a tank without reference to any mark made by the liquid on the gauge tape, thus eliminating errors due to creeping or to variable height of meniscus.

An object of the invention is to provide means for gauging vapor-tight tanks without permitting leakage of vapor.

The basic principle of the invention is to measure the distance between the bottom of the tank and an object floating at the surface of the liquid contained therein. In essence, the apparatus consists of a bob or weight suspended by a graduated tape, a float in a plane having an extended surface, a tape passing through an opening in the float through which the bob will not pass, a reference point or mark affixed to the roof of the tank, and means for raising and lowering the tape through an opening in the roof.

In the use of this simple form, in which the means for raising and lowering the tape may be the hand of the operator, the tape is lowered until the bob encounters the bottom of the tank, at which point the graduation opposite the reference mark is observed. The tape is then raised until the upper end of the bob encounters the lower side of the float, at which point a second reading of the tape is made. To the difference between these readings must be added the length of the bob and the depth to which the float is submerged.

As the above simple procedure requires a free opening through the tank roof and a calculation to obtain the net gauge, its utility is not great. I have therefore provided, in the apparatus hereinafter described, means for compensating bob length and submergence, for altering the compensation to care for variations in submergence following change in specific gravity of the tank contents, and for obtaining the net gauge either by double gauging and subtracting or by direct reading. These various means have been arranged in such manner that they may be operated and the observations made from without a vapor-tight housing placed over the opening in the roof.

The invention will best be understood with reference to the attached drawings and the following description thereof, in which.

Figure 2:
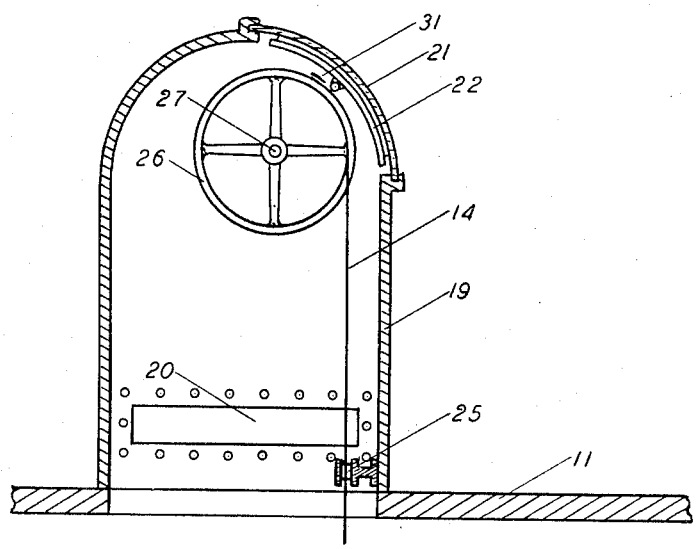
Fig. 2 is a section through the float and bob, in position in a tank containing liquid.
Figure 1:
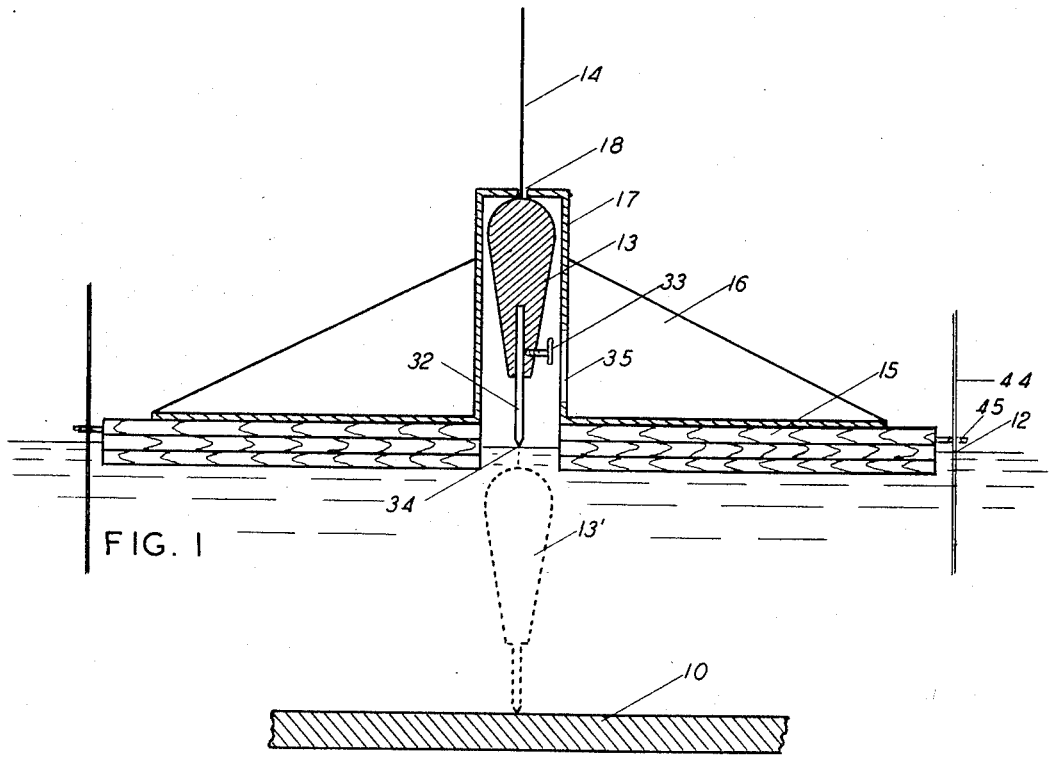
Fig. 1 is a section showing the portion of the device which rests on the tank roof.

Referring first to Figs. 1 and 2, 10 is a fragment of a tank bottom, 11 is a fragment of the roof, and 12 indicates the upper surface of a body of liquid contained in the tank.

A bob or weight 13 is attached to the lower end of a steel or other nonstretchable tape 14 which is graduated in any preferred manner, from top to bottom, usually in inches and eighths.

A float 15 rests on the surface of the liquid and partially submerged therein. This float may be of hollow metal or plastic or of well seasoned plywood, rendered liquid-tight by coatings of shellac or of a suitable lacquer. This float should be a substantially perfect plane and if too thin to be rigid may be stiffened by radial ribs 16 of light sheet metal. It should be guided and held in position in the tank by two or more vertical wires 44 tightly stretched between the tank bottom and the roof and passing through eyes 45 attached to the float.

The float is provided with an exactly centered perforation of such size as to permit the free passage of the bob, and around this perforation a tube 17 is projected upwardly for a distance approximately equal to the length of the bob. The upper end of the tube is closed in and is slotted as at 18 to permit the free passage of the tape while preventing the passage of the bob through the head.

Figure 3:
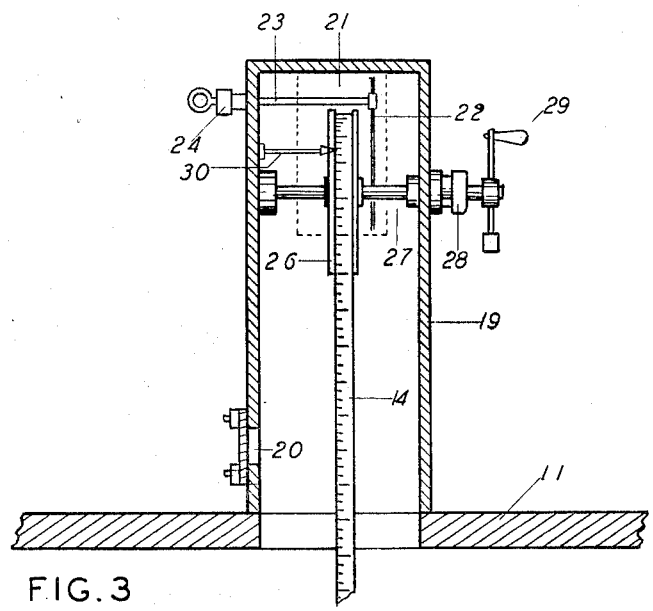
Fig. 3 is a section through the housing 19, at a right angle to the view of Fig. 1, showing portions of the tape reeling mechanism in elevation.

Referring to Figs. 1 and 3, a housing 19 of steel plate or other suitable material is erected over an opening in the tank roof and may be attached to it in such manner as to be vapor-tight. If the bottom of the tank is flat and level, it is preferable to place the opening and housing adjacent to the tank wall but if the bottom is dished, the opening should be so placed that the bob will reach its lowest point, at which point a level plate should be placed to receive the point of the bob.

An opening 20 having a removable cover plate may desirably be provided to permit the withdrawal of the float for inspection and of the bob for adjustment as will be described. The housing is also provided with a conveniently located observation window 21 which may desirably be equipped with a wiper blade 22 for removing mist from the interior surface. This blade should be actuated from without the housing, as by means of a pull-rod 23 extending through a stuffing box 24. A bracket 25 projected from the wall of the housing carries felt wiping pads acting on the two sides of the tape for removing oil or other liquid which might obscure the tape graduations.

Within the housing a reel 26 is mounted on a shaft 27 which extends through a stuffing box 28 and terminates in a counterbalanced handcrank 29. The upper end of tape 13 is affixed to the reel. The shaft should be carried on frictionless bearings and the adjustment of the stuffing box packing should be such as to offer the least possible resistance to rotation.

A pointer 30 is projected from the interior of the housing in such manner that its point falls close to the face of the tape and more or less at the center of window 21. This point provides the reference point at which tape readings are made.

The bob 13 should be so constructed as to be adjustable in length. A convenient way is to insert a threaded tip 32 which may be run up and down and finally locked in the desired position as by a set screw 33. To compensate at once for submergence and any initial error in the length of bob or height of tube, the float is placed on a body of the liquid which the tank is to hold and, with the bob in its uppermost position the point is adjusted until its extreme tip touches the surface of the liquid as at 34. For making this adjustment it is desirable to make openings 35 in the wall of tube 17.

With the bob so adjusted, differential gauges may be made without correction for bob length or for float submergence, so long as the contents of the tank remain at the specific gravity for which the adjustment is made. Any material change in specific gravity may be compensated by readjusting the position of the point, or in another manner which will be described.

In using this apparatus for making differential gauges, crank 27 is revolved underhand until the tip of bob 13 touches the tank bottom, as illustrated by the dotted outline 13' in Fig. 1. The point of contact is indicated by a perceptible decrease in tension on the tape. A reading of the tape at reference point 30 is made. The reel is then revolved overhand until the bob encounters the upper end of tube 17, a point indicated by a perceptible increase in tape tension. A second reading of the tape is made, the first reading subtracted from it, and the difference taken as the depth of liquid in the tank.

Figure 4:
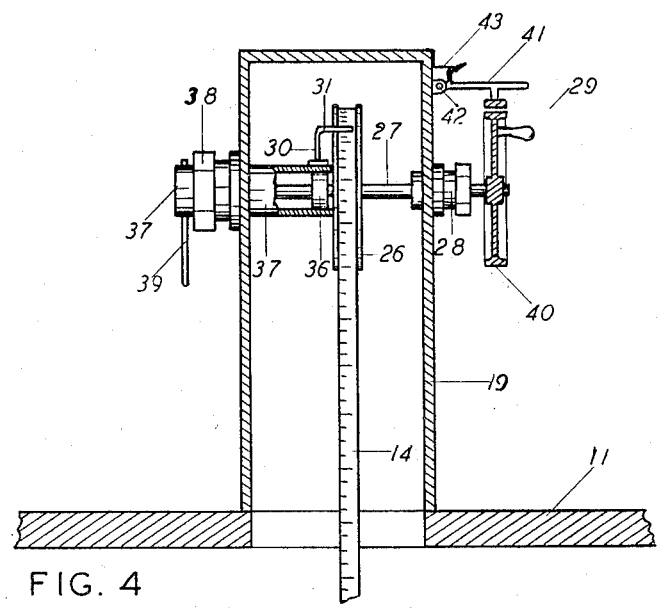
Fig. 4 is a section through the housing illustrating a modified form of the tape reeling mechanism.

In making gauges in the above manner the distance from the roof of the tank to the tank bottom is immaterial, so long as it does not change between the two readings. In making direct gauges, however, it is necessary to compensate for variations in this distance such as may be produced by temperature changes or by buckling of the roof. The modified form illustrated in Fig. 4 makes provision for such compensation.

Referring to that figure, shaft 27 on which the reel is mounted is carried at its inner end on bearings 36—36 which are mounted in a coaxial tube 37. This tube passes through a stuffing box 38 in the wall of the housing and is provided with a handle 39 by which it may be rotated. Arm 30, carrying a reference bar 31, is projected from the inner end of tube 37 instead of from the wall of the housing as previously described, the bar thus travelling in an arc around the rim of the reel and over the face of the tape when the tube is rotated. The tape should be so graduated that when the point of the bob just touches the tank bottom, the zero point of the tape will fall about midway the height of the window 21 through which it is observed.

The hand crank 29 is attached to a light brake drum 40 of relatively large diameter and a brake in the form of a weighted bell crank 41 is pivoted to the housing wall as at 42. This brake may be lifted from the drum and retained by a spring catch 43 when not in use.

To make direct or single reading gauges with this device the brake is released and the crank rotated until the bob touches bottom. The brake is then applied to prevent the weight of the tape from rotating the reel, and tube 37 is rotated by handle 39 until the upper edge of reference bar 31 coincides with the zero mark on the tape, the packing in stuffing box 38 being sufficiently tight to retain the tube in the position in which it is set. A fine-toothed ratchet with a pawl may be substituted for the brake illustrated, or any convenient form of clamp may be used.

The brake is next released and the reel rotated until the bob encounters the upper end of tube 17, as previously described, and the tape is again read, the reading at this point being a direct gauge of the depth of liquid in the tank.

While the materials of which the float is made are immaterial, so long as it remains liquid tight, the relation of weight of bob to weight and area of float have an important bearing on the accuracy of the readings obtained. The manner of manipulating the reel is also significant.

At the lower end of the tape travel there is a single and definite end point, that at which the bob touches the tank bottom. The ease and accuracy with which this point may be ascertained increase as the weight of the bob increases, but for reasons which will appear it is not desirable to make this weight any greater than necessary. Ordinarily a bob weighing ½ pound will be found suitable for use in nonviscous liquids and a weight of about 1 pound for use in viscous oils.

For locating the upper end point there are three manipulations available. The first is to strike the float with the bob without lifting the float, noting the jar transmitted through the tape to the hand crank. The second is to lift the float gently until the increase in weight becomes perceptible. The third is to lift the float entirely away from the surface of the liquid and note the decrease in weight at the instant of parting.

The third method gives a sharp indication but suffers the disadvantage that as the decrease in apparent weight is of the order of 0.2 to 0.4 pound per square foot of float surface (irrespective of the actual weight of the float) and as the operator's hand is lifting a dead weight of at least several pounds, it is practically impossible to avoid overrunning and thus losing the reading.

The second method is highly subject to personal equation, giving different results in the hands of different operators. In lifting the float out of the liquid the tape tension transmitted to the operator's hand increases as a straight line function up to the point at which the float breaks away from the liquid surface, the increase in tension beginning at the point where the submergence of the float starts to decrease. It is practically impossible to build a float of sufficient area having less than 0.2 inch submergence, and before breaking away from the surface the float will elevate by adhesion a column of oil from 0.05 inch to 0.1 inch above the actual liquid level. Thus the total increase in tape tension is manifested over a minimum tape travel of say ¼ inch and will become perceptible to different operators at different points along this travel.

I therefore prefer to follow the first named method, of noting the point of impact of the bob against the upper end of the tube 17 which is projected upwardly from the float. If the float be reasonably heavy and particularly if it be of considerable area, so that movement is resisted by the inertia of a correspondingly large amount of liquid adhering to its lower surface, it can be struck quite sharply by the bob without being actually elevated and without setting up waves on the liquid surface. The approximate point of contact being thus obtained, the lowering and raising of the bob through small distances will permit the contact point to be felt with great accuracy and thus errors in reading will be reduced almost to the vanishing point.

In making readings by this first method I prefer to make the float fairly heavy, as of the order of 2 to 3 pounds per square foot, and to give it considerable area, as for example from 3 to 5 square feet. On the other hand, if either the second or third manner of determining the end point is to be followed, the weight of the float should not exceed 1 pound and is preferably about ½ pound, in order to reduce the depth of submergence to a minimum.

I claim as my invention:

1. Apparatus for gauging the depth of liquid in a tank, comprising: a float independent of any part of said tank and resting at the surface of said liquid with a depth of submergence varying only with changes in the specific gravity of said liquid; a graduated tape passing through said float and a bob suspended from said tape beneath said float; means including said tape for raising and lowering said bob to encounter successively the lower side of said float and the bottom of said tank, and a mark in a fixed position as regards said tank against which the graduations of said tape may be read.

2. Apparatus substantially as set forth in claim 1, in which said float has an upwardly projected well arranged to receive and to intercept said bob on upward movement thereof.

3. Apparatus substantially as set forth in claim 1, in which said float has an upwardly projected well arranged to receive and to intercept said bob on upward movement, in which the length of said bob is approximately equal to the depth of said well, and including means for adjusting said length.

4. Apparatus for gauging the depth of liquid in a tank having a roof, comprising: a float independent of said roof and adapted to rest at the surface of said liquid with a substantially constant submergence therein; a graduated tape passing through said float and a bob suspended from said tape beneath said float; a tape reel supported above an opening in said tank roof; means for rotating said reel and thereby bringing said bob into contact successively with the bottom of said tank and with said float, and a reference mark in a fixed position as regards said roof against which the graduations of said tape may be read.

5. Apparatus for gauging the depth of liquid in a vapor-tight tank, comprising: a float independent of any part of said tank and adapted to rest at the surface of said liquid with a substantially constant submergence therein; a graduated tape passing through said float and a bob suspended from said tape beneath said float; a tape reel supported within a vapor-tight housing covering an opening in said tank; a reference pointer movably supported within said housing overlying said reel and a portion of said tape; means external to said housing for adjusting the position of said pointer to vary its indication on the graduations on said tape, and a transparent window in said housing overlying said pointer.

MARION E. DICE.